3,008,079
POWER SUPPLY
Richard C. Scott, Southfield Township, Oakland County, Mich., assignor to The Udylite Corporation, Detroit, Mich., a corporation of Delaware
Filed Feb. 3, 1958, Ser. No. 712,777
1 Claim. (Cl. 321—27)

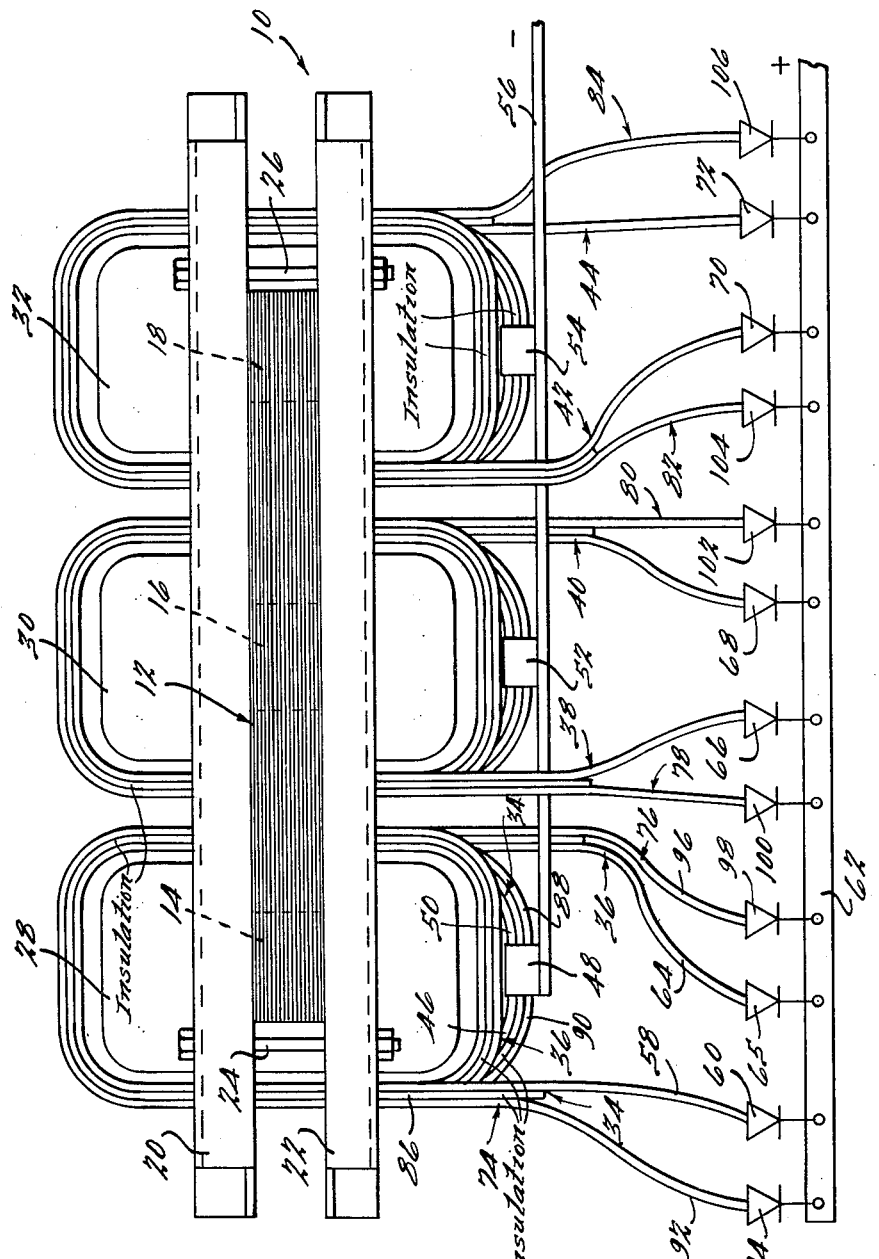

This invention relates to electric power supply systems and more particularly to transformer-rectifier power supplies for deriving a direct current or a pulsating direct current from an alternating current source.

Power supply systems for producing the high-magnitude direct currents required for electroplating or anodizing operations customarily include a transformer having a primary winding energizable from a source of alternating voltage and at least one secondary winding normally formed of heavy copper bar stock, with the number of secondary turns being selected to produce the requisite output voltage in the light of the supply voltage and the number of effective turns in the primary winding. One end of the secondary winding is connected to one of two direct-voltage output terminals and the other end of the secondary winding is connected to the other one of the direct-voltage output terminals through a rectifying device so as to produce between the output terminals a half-wave-rectified voltage.

In some cases, a pair of secondary windings are provided, with one end of one secondary winding being electrically connected to one end of the other secondary winding and to one of the two output terminals. The other end of each of the two windings is connected to the other output terminal through an individual rectifier, with the alternating voltages developed across those two secondary windings being 180° out of phase with one another so as to produce a full-wave-rectified voltage between the output terminals. These same principles are applied to polyphase transformers, with one or two secondary windings being provided, as above described, for each phase of the supply voltage.

Where the current requirements for the electroplating or anodizing operation are in excess of the capabilities of the transformer of the above noted nature, an additional secondary winding has, in the common practice, been provided for each of the existing secondary windings with each additional secondary winding being connected directly across and in parallel with its respective original secondary winding. With the same number of turns in both the original and the added secondary windings and with similar cross sections and lengths, the current handling capability is thereby doubled. Since the supplying of twice the current to the rectifier which was associated with the original winding would likely exceed the current ratings of that rectifier, it has been customary to connect a second purportedly identical rectifier directly across and in parallel with each preexisting rectifier so that each of the two rectifiers is common both to the original secondary winding and to the added secondary winding.

It has previously been discovered that such an arrangement leads to difficulties even where, for example, rectifiers having a relatively high forward resistance, such as selenium rectifiers, known as "dry disk" rectifiers, are employed and particularly where rectifiers having a relatively low forward resistance, such as semiconductor rectifying devices, as silicon and germanium rectifiers, known as "crystal" rectifiers, are utilized. The two paralleled rectifiers tend to have at least slightly different forward resistances, with the likelihood of a substantial percentage difference being greater in the case of semiconductor or crystal rectifying devices than is the case with selenium or dry disk rectifying devices. If such a disparity exists, the rectifier having the lower forward resistance tends to pass current substantially in excess of its rating, leading to its destruction.

This problem has previously been recognized and several solutions have been offered. In one solution, the forward resistances of the two paralleled rectifiers are carefully measured and a resistor is inserted in series with the rectifier having the lower of the two resistances in order to bring them into balance. Accurate balance is difficult to achieve and difficult to maintain with aging. In another solution, interphase windings are provided, which substantially complicates the cost and complexity of the transformer. In another solution, two entirely independent transformer-rectifier power supplies of the nature of any of the above described units are connected in parallel across the load terminals. This relieves the problem, but necessitates the use of two separate transformers including two separate core structures, thereby increasing the cost and the space requirements of the installation.

The same considerations, of course, apply where the current handling capability of the system is trebled or quadrupled by the addition of second and third additional windings for each preexisting secondary winding or third and fourth, paralleled auxiliary transformer-rectifier power supply systems.

In accordance with the present teachings, but a single transformer core structure is employed and additional windings are provided as required to meet the current requirements, but each secondary winding is provided with a rectifier individual thereto so that there is no problem of establishing balance between the forward resistances of the rectifiers and no rectifier will be called upon to carry current in excess of its rating.

The nature of the invention, and its objects and features, will become apparent from the following detailed description of an embodiment of the invention when read with reference to the accompanying drawing which shows, in a single schematic and diagrammatic view, elements of a supply system embodying the principles of the present invention.

In the drawing, the transformer 10 includes a laminated, double-window core 12 having three leg portions 14, 16 and 18. The core laminations are retained in position in any suitable manner such as by clamping the stack by means including the angles 20 and 22 which are interjoined by bolts 24 and 26.

A primary winding 28 is wound around the transformer core leg portion 14, a primary winding 30 is wound around the central leg portion 16 and a primary winding 32 is wound around the leg portion 18. These primary windings are conventional in nature and are energized by the individual phases of a three-phase source (not shown) in the customary manner.

A pair of secondary windings 34 and 36 are formed around transformer primary 28, a pair of secondary windings 38 and 40 are formed around transformer primary 30 and a pair of secondary windings 42 and 44 are formed around transformer primary 32. Those secondary windings are illustrated to be spaced from their respective primary windings, suitable nonconductive inserts (not shown) normally being employed for this purpose. Each such winding is illustratively shown to consist of but a single layer of helically wound copper bar stock which may have a cross sectional size, as an illustration, of one-eighth by three-quarter inch. The number of turns will, of course, be dictated by the output voltage requirements in the light of other factors, as above discussed.

The end 46 of winding 36 is electrically connected to conductive member 48 as is the end 50 of secondary winding 34, the corresponding ends of windings 38 and 40 are similarly connected to conductive member 52 and the corresponding ends of windings 42 and 44 are similarly connected to conductive member 54. Each of the conductive members 48, 52 and 54 is electrically connected to a negative output terminal bus 56.

The end 58 of winding 34 is connected to one terminal of a rectifier 60 the other terminal of which is connected to the positive output terminal bus 62, and the other end 64 of secondary winding 36 is connected to bus 62 through rectifier 65. Windings 38, 40, 42 and 44 are similarly provided with individual rectifiers 66, 68, 70 and 72, respectively. Each of these rectifiers may be of any suitable type capable of handling the requisite currents but the practice of the principles of the present invention is most advantageous if semiconductive rectifying devices, such as silicon or germanium rectifiers are employed.

It will be observed that the alternating voltage developed between end 58 of winding 34 and the negative bus 56 is 180° out of phase with the alternating voltage appearing between end 64 of winding 36 and negative bus 56. As a result, rectifiers 60 and 65 cooperate to provide a full-wave rectified phase voltage. The same considerations apply to windings 38 and 40 and to windings 42 and 44.

To, for example, double the current handling capabilities of the system, an additional winding is, in the disclosed arrangement, overwound each of the described secondary windings. Thus, windings 74, 76, 78, 80, 82 and 84 are overlaid secondary windings 34, 36, 38, 40, 42 and 44, respectively. Each turn of each of the secondary windings is, of course, electrically insulated from each other turn of that winding, and each of the additional windings is electrically insulated from its associated original secondary winding over its entire length except for a common connection at one end. Thus, insulator 86 is disposed between secondary windings 34 and 74 and similar insulators are provided between each of the other pairs of overlaid windings. The end 88 of winding 74 (which corresponds with end 50 of winding 34) is also electrically connected to the conductive member 48 as is the end 90 of winding 76 (which corresponds with the end 46 of winding 36). It is only at these points that the windings 34, 36, 74 and 76 are directly electrically interconnected. Similarly, one end of each of the windings 78 and 80 is connected to conductive member 52 and one end of each of the windings 82 and 84 is connected to the conductive member 54.

The other end 92 of winding 74 is connected to one terminal of an individual rectifier 94 the other terminal of which is connected to the positive bus 62. The end 96 of the additional secondary winding 76 is connected to one terminal of a rectifier 98 the other terminal of which is also connected to the positive bus 62. The other added windings 78, 80, 82 and 84 are similarly provided with individual rectifiers 100, 102, 104 and 106. All of the rectifiers are preferably of the same type.

It will be observed that the alternating voltage developed between end 92 of winding 74 and the negative output terminal 56 is in phase with the alternating voltage developed between end 58 of winding 34 and the negative bus 56, and that the alternating voltage developed between the end 96 of winding 76 and the negative output terminal 56 is in phase with the alternating voltage developed between end 64 of winding 36 and that negative output terminal. Similar phase relationships exist in connection with the other sets of secondary windings.

By virtue of this construction, each of the secondary windings is provided with an individual rectifier and no rectifier is common to more than one winding. Therefore, each rectifier carries but the current of its own secondary winding and close matching of the forward resistances of the rectifiers is not necessary, for no rectifier will be subjected to the current overload condition which tends to result in a system in which the rectifiers are directly paralleled. The present arrangement therefore offers a simple and satisfactory solution to the above noted problems.

It will be appreciated that the principles of the invention can also be applied to single-phase power supplies or to polyphase power supplies in which other than three phases are utilized. Similarly, it will be appreciated that additional secondary windings may be overlaid the provided additional windings in order to further increase the current carrying capabilities of the system.

While it will be apparent that the embodiment of the invention herein disclosed is well calculated to fulfill the objects of the invention, it will be appreciated that the invention is susceptible to modification, variation and change without departing from the proper scope or fair meaning of the subjoined claim.

What is claimed is:

In a direct current supply system for supplying direct current to a load, the combination of a pair of output terminals connectable to the load, a polyphase transformer having a core having a straight leg per phase, a primary winding having one continuous portion per phase disposed on the respective straight leg of said core, four secondary windings for each of said phases, all of said four secondary windings for any one phase being disposed upon an individual one of said straight legs of said core, a first and second of said secondary windings for each phase being coaxial and disposed in end-to-end abutting relation adjacent one another on the respective straight leg, each of the third and fourth secondary windings per phase being wound directly over said first and second ones of said secondary windings respectively and said third and fourth secondary windings for each phase being coaxial and disposed in end-to-end abutting relation adjacent one another, all of said four secondary windings per phase being wound over the respective continuous primary winding portion, conductor means electrically connecting one end of all four of said secondary windings per phase directly to one another and directly to one of said output terminals, insulating means for insulating said secondary windings from one another over their entire length except for said one end, and four separate spaced crystal rectifiers per phase each individual to each of said secondary windings and each connected between the other end of the winding to which it is individual and the other one of said output terminals, the alternating voltages developed across said first and third of said secondary windings for any one phase being in phase with one another, the alternating voltages developed across said second and fourth of said windings for any one phase being in phase with one another and 180° out of phase with the alternating voltages developed across said first and third secondary windings.

References Cited in the file of this patent

UNITED STATES PATENTS

| 1,153,794 | Jonas | Sept. 14, 1915 |
| 1,826,794 | Kubler | Oct. 13, 1931 |
| 1,831,886 | Ross | Nov. 17, 1931 |
| 1,967,303 | Grant | July 24, 1934 |
| 2,024,739 | Maslin et al. | Dec. 17, 1935 |
| 2,224,755 | Werner | Dec. 10, 1940 |
| 2,859,398 | Johnson et al. | Nov. 4, 1958 |
| 2,921,250 | Swain | Jan. 12, 1960 |